(12) United States Patent
Jang et al.

(10) Patent No.: US 11,967,325 B2
(45) Date of Patent: Apr. 23, 2024

(54) ELECTRONIC DEVICE AND METHOD FOR CONTROLLING THE ELECTRONIC DEVICE

(71) Applicant: SAMSUNG ELECTRONICS CO., LTD., Suwon-si (KR)

(72) Inventors: Saebom Jang, Suwon-si (KR); Hyeonmok Ko, Suwon-si (KR); Kyenghun Lee, Suwon-si (KR); Kunal Sharma, Karnataka (IN); Raghavendra Hanumantasetty Ramasetty, Karnataka (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/148,693

(22) Filed: Dec. 30, 2022

(65) Prior Publication Data

US 2023/0136901 A1    May 4, 2023

Related U.S. Application Data

(63) Continuation of application No. 16/897,427, filed on Jun. 10, 2020, now Pat. No. 11,545,149.
(Continued)

(30) Foreign Application Priority Data

Oct. 14, 2019   (KR) .................. 10-2019-0127219

(51) Int. Cl.
*G10L 15/22*     (2006.01)
*G10L 15/02*     (2006.01)
(Continued)

(52) U.S. Cl.
CPC ............ *G10L 15/22* (2013.01); *G10L 15/285* (2013.01); *G10L 15/34* (2013.01); *G10L 15/02* (2013.01); *G10L 15/30* (2013.01)

(58) Field of Classification Search
CPC ....... G10L 15/22; G10L 15/285; G10L 15/34; G10L 15/02; G10L 15/30
See application file for complete search history.

(56) References Cited

U.S. PATENT DOCUMENTS

| 6,061,653 A | 5/2000 | Fisher |
| 6,374,212 B2 | 4/2002 | Phillips et al. |
| (Continued) | | |

FOREIGN PATENT DOCUMENTS

| CN | 107004410 A | 8/2017 |
| CN | 107210033 A | 9/2017 |
| (Continued) | | |

OTHER PUBLICATIONS

Communication dated Jun. 24, 2021, issued by the India Intellectual Property Office in Indian Patent Application No. 202014027047.
(Continued)

*Primary Examiner* — Brian L Albertalli
(74) *Attorney, Agent, or Firm* — Sughrue Mion, PLLC

(57) ABSTRACT

Disclosed are an electronic device capable of efficiently performing speech recognition and natural language understanding and a method for controlling thereof. The electronic device includes: a microphone; a non-volatile memory configured to store virtual assistant model data comprising data that is classified according to a plurality of domains and data that is commonly used for the plurality of domains; a volatile memory; and a processor configured to: based on receiving, through the microphone, a trigger input to perform speech recognition for a user speech, initiate loading the virtual assistant model data from the non-volatile memory into the volatile memory, load, into the volatile memory, first data from among the data classified according to the plurality of domains and, while loading the first data into the volatile
(Continued)

memory, load at least a part of the data commonly used for the plurality of domains into the volatile memory.

17 Claims, 12 Drawing Sheets

Related U.S. Application Data

(60) Provisional application No. 62/889,232, filed on Aug. 20, 2019.

(51) Int. Cl.
    *G10L 15/28*     (2013.01)
    *G10L 15/30*     (2013.01)
    *G10L 15/34*     (2013.01)

(56) References Cited

U.S. PATENT DOCUMENTS

| | | | |
|---|---|---|---|
| 7,930,180 B2 | 4/2011 | Ishikawa et al. |
| 8,126,832 B2 | 2/2012 | Spring |
| 9,070,366 B1 | 6/2015 | Mathias et al. |
| 9,508,339 B2 | 11/2016 | Kannan et al. |
| 9,536,516 B2 | 1/2017 | Catchpole |
| 9,542,947 B2 | 1/2017 | Schuster et al. |
| 9,734,830 B2 | 8/2017 | Lindahl |
| 9,812,130 B1 | 11/2017 | Corfield |
| 10,235,996 B2 | 3/2019 | Renard et al. |
| 10,789,953 B2 | 9/2020 | Renard et al. |
| 2003/0009334 A1 | 1/2003 | Printz et al. |
| 2008/0262842 A1 | 10/2008 | Liang et al. |
| 2009/0253463 A1 | 10/2009 | Shin et al. |
| 2013/0158996 A1 | 6/2013 | Fastow et al. |
| 2013/0158997 A1 | 6/2013 | Natarajan |
| 2014/0019128 A1 | 1/2014 | Riskin |
| 2015/0142447 A1 | 5/2015 | Kennewick |
| 2015/0340028 A1 | 11/2015 | Kim |
| 2016/0098992 A1 | 4/2016 | Renard et al. |
| 2016/0217124 A1 | 7/2016 | Sarikaya et al. |
| 2016/0225370 A1 | 8/2016 | Kannan et al. |
| 2017/0076726 A1 | 3/2017 | Bae |
| 2017/0092278 A1 | 3/2017 | Evermann et al. |
| 2017/0206900 A1 | 7/2017 | Lee et al. |
| 2017/0257470 A1 | 9/2017 | Youn et al. |
| 2017/0278514 A1 | 9/2017 | Mathias et al. |
| 2018/0012597 A1 | 1/2018 | Mathias et al. |
| 2019/0103100 A1 | 4/2019 | Rozen et al. |
| 2019/0180750 A1 | 6/2019 | Renard et al. |
| 2019/0341031 A1 | 11/2019 | Cox |
| 2020/0242198 A1 | 7/2020 | Ji |

FOREIGN PATENT DOCUMENTS

| | | | |
|---|---|---|---|
| CN | 108604449 A | 9/2018 |
| JP | 2009-86202 A | 4/2009 |
| JP | 2013-101204 A | 5/2013 |
| KR | 101913191 B1 | 10/2018 |
| WO | 03/067572 A2 | 8/2003 |
| WO | 2006/030214 A2 | 3/2006 |

OTHER PUBLICATIONS

Dirk Van Compemolle, "Speech Recognition at Lernout & Hauspie An opportunity for embedded systems" Real Time Magazine, Belgium, Apr. 1999, XP001018655, 4 total pages.

Search Report dated Dec. 22, 2020 by the European Patent Office in corresponding European Patent Application No. 20185687.9.

International Search Report (PCT/ISA/210) dated Sep. 9, 2020 issued by the International Searching Authority in International Application No. PCT/KR2020/007331.

Patterson; David A., and John L. Hennessy. "Computer organization and design: The hardware/software." Computer Organization and Design, The Hardware/Software Interface. Morgan Kaufmann, 2004. (Year: 2004).

Microsoft Press. 2002. Microsoft Computer Dictionary, Fifth Edition (5th ed.). Microsoft Press, USA. (Year: 2002).

Communication dated Jul. 25, 2023, issued by the European Patent Office in counterpart European Application No. 23160602.1.

Communication dated Sep. 14, 2023, issued by the China National Intellectual Property Administration in counterpart Chinese Application No. 202010519019.2.

Communication issued Dec. 14, 2023 by the Intellectual Property India for Indian Patent Application No. 202014027047.

ELECTRONIC DEVICE AND METHOD FOR CONTROLLING THE ELECTRONIC DEVICE

CROSS-REFERENCE TO RELATED APPLICATION(S)

This application is a continuation application of U.S. patent application Ser. No. 16/897,427, filed Jun. 10, 2020, which is based on and claims priority under 35 U.S.C. § 119 to Korean Patent Application No. 10-2019-0127219, filed on Oct. 14, 2019, in the Korean Intellectual Property Office, and claims the benefit of U.S. Provisional Patent Application No. 62/889,232, filed on Aug. 20, 2019, in the United States Patent and Trademark Office, the disclosures of which are incorporated herein in their entirety by reference.

BACKGROUND

1. Field

The disclosure relates to an electronic device and a method for controlling the electronic device and, more particularly, to an electronic device capable of efficiently performing speech recognition and natural language understanding processes and a method for controlling thereof.

2. Description of Related Art

Recently, technology development in the field of artificial intelligence (AI) assistant has been accelerated and technologies using speech recognition and natural language understanding have been applied to various kinds of electronic devices. Under these circumstances, the improvement of not only the response performance for user speech, but also the response speed for the user speech is highlighted as one of the main tasks to be solved.

In order to solve the problem of response speed for user speech, there is a method of pre-loading all the data for performing speech recognition and natural language understanding in a background and waiting for a reception of a user speech. With this method, however, there is a problem in that not a large load is added to a memory, and the load increases more as the information to be processed varies more.

There is also a method of processing a user speech after loading and initializing all the data necessary to process the user speech under a condition that the user's trigger input is received. With this method, however, there is a problem in that the time to output the response to the user speech is delayed as much as the time required to load and initialize the data.

Accordingly, there is a need for a technique for improving the processing speed for user speech while reducing the load on memory.

SUMMARY

Provided are an electronic device capable of efficiently controlling a loading process for data related to speech recognition and natural language understanding and a handling process for user speech, and a method for controlling thereof.

Additional aspects will be set forth in part in the description which follows and, in part, will be apparent from the description, or may be learned by practice of the presented embodiments.

In accordance with an aspect of the disclosure, an electronic device includes: a microphone; a non-volatile memory configured to store virtual assistant model data including data that is classified according to a plurality of domains and data that is commonly used for the plurality of domains; a volatile memory; and a processor configured to: based on receiving, through the microphone, a trigger input to perform speech recognition for a user speech, initiate loading the virtual assistant model data from the non-volatile memory into the volatile memory, load, into the volatile memory, first data from among the data classified according to the plurality of domains and, while loading the first data into the volatile memory, load at least a part of the data commonly used for the plurality of domains into the volatile memory.

The processor may be further configured to: based on receiving a first user speech through the microphone, obtain a first text corresponding to the first user speech by performing speech recognition for the first user speech; and based on the obtained first text, identify at least one first domain corresponding to the first user speech among the plurality of domains.

The processor may be further configured to, based on the identified at least one first domain, load, as the first data, data corresponding to the identified at least one first domain, from among the data classified according to the plurality of domains, into the volatile memory.

The processor may be further configured to: process the loaded first data corresponding to the identified at least first one domain; and perform natural language understanding for the first text based on the processed first data.

The processor may be further configured to maintain the loaded first data corresponding to the identified at least one first domain in the volatile memory for a predetermined period.

The processor may be further configured to: based on receiving a second user speech through the microphone while the first data corresponding to the identified at least one first domain is maintained in the volatile memory, identify at least one second domain corresponding to the second user speech; and load second data, among the data classified according to the plurality of domains, corresponding to the identified at least one second domain and different from the first data, into the volatile memory.

The processor may be further configured to: based on the electronic device being turned on, load data, among the data commonly used for the plurality of domains, corresponding to a module for recognizing the trigger input, into the volatile memory; and based on recognizing the trigger input using the loaded data corresponding to the module for recognizing the trigger input, determine to perform the speech recognition for the user speech.

In accordance with another aspect of the disclosure, a method for controlling an electronic device including a volatile memory and a non-volatile memory storing virtual assistant model data including data classified in accordance with a plurality of domains and data commonly used for the plurality of domains, includes: based on receiving a trigger input to perform speech recognition for a user speech, initiating loading the virtual assistant model data from the non-volatile memory into the volatile memory; loading, into the volatile memory, first data, from among the data classified according to the plurality of domains; and while loading the first data into the volatile memory, loading at least a part of the data commonly used for the plurality of domains into the volatile memory.

The method may further include: based on receiving a first user speech, obtaining a first text corresponding to the first user speech by performing speech recognition for the first user speech; and based on the obtained first text, identifying at least one first domain corresponding to the first user speech among the plurality of domains.

The loading the first data may include: based on the identified at least one first domain, loading, as the first data, data corresponding to the identified at least one first domain, from among the data classified according to the plurality of domains, into the volatile memory.

The method may further include: processing the loaded first data corresponding to the identified at least one first domain; and performing natural language understanding for the first text based on the processed first data.

The method may further include maintaining the loaded first data corresponding to the identified at least one first domain in the volatile memory for a predetermined period.

The method may further include: based on receiving a second user speech while the first data corresponding to the identified at least one first domain is maintained in the volatile memory, identifying at least one second domain corresponding to the second user speech; and loading second data, among the data classified according to the plurality of domains, corresponding to the identified at least one second domain and different from the first data, into the volatile memory.

The method may further include: based on the electronic device being turned on, loading data, among the data commonly used for the plurality of domains, corresponding to a module for recognizing the trigger input, into the volatile memory; and based on recognizing the trigger input using the loaded data corresponding to the module for recognizing the trigger input, determining to perform the speech recognition for the user speech.

In accordance with another aspect of the disclosure, a non-transitory computer readable recording medium has recorded thereon instructions executable by at least one processor for performing the above method.

In accordance with another aspect of the disclosure, an electronic device includes: a non-volatile memory configured to store virtual assistant model data including data that is classified according to a plurality of domains and data that is commonly used for the plurality of domains; a volatile memory; and a processor configured to: based on determining that a trigger input to perform speech recognition for a user speech is received, loading, into the volatile memory, first data from among the data classified according to the plurality of domains, and while loading the first data into the volatile memory, load at least a part of the data commonly used for the plurality of domains into the volatile memory.

The processor may be further configured to: based on receiving a first user speech, obtain a first text corresponding to the first user speech by performing speech recognition for the first user speech; and based on the obtained first text, identify at least one first domain corresponding to the first user speech among the plurality of domains.

The processor may be further configured to, based on the identified at least one first domain, load, as the first data, data corresponding to the identified at least one first domain, from among the data classified according to the plurality of domains, into the volatile memory.

The processor may be further configured to: process the loaded first data corresponding to the identified at least first one domain; and perform natural language understanding for the first text based on the processed first data.

The processor may be further configured to: based on receiving a second user speech while the first data corresponding to the identified at least one first domain is maintained in the volatile memory, identify at least one second domain corresponding to the second user speech; and load second data, among the data classified according to the plurality of domains, corresponding to the identified at least one second domain and different from the first data, into the volatile memory.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Embodiments will be described in greater detail with reference to the attached drawings so that those skilled in the art can easily work the disclosure.

Figure 1:
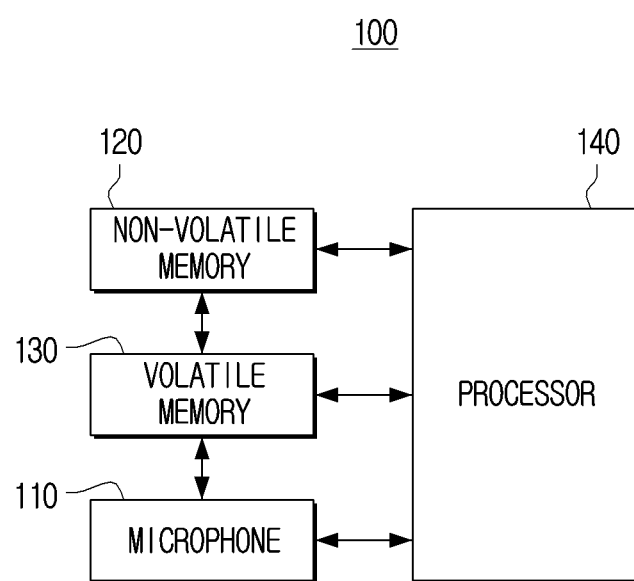
FIG. 1 is a block diagram briefly illustrating a configuration of an electronic device according to an embodiment.

FIG. 1 is a block diagram briefly illustrating a configuration of an electronic device 100 according to an embodiment.

As illustrated in FIG. 1, the electronic device 100 includes a microphone 110, a non-volatile memory 120, a volatile memory 130, and a processor 140 (e.g., at least one processor).

The microphone 110 may acquire a signal for sound or voice generated outside. The microphone 110 may acquire vibration caused by sound or voice generated outside and convert the acquired vibration into an electric signal.

The microphone 110 may acquire a signal for user speech generated by a user utterance. The term "user speech" herein may be interchangeable with terms such as "user voice" or "user utterance." The acquired signal can be converted into a digital signal and stored in the volatile memory 130. The microphone 110 may include an analog-to-digital (A/D)

converter and/or may operate in association with an A/D converter located outside the microphone. At least some of the user speech received via the microphone 110 may be input to a speech recognition and natural language understanding model. Specifically, the user speech received via the microphone 110 after a trigger input corresponding to a virtual assistant model may be specified by a user speech input to the speech recognition and natural language understanding model.

For example, if "Hi, ABC" is a predetermined trigger word and a user speech "Hi ABC, how is the weather today?" is received through the microphone 110, "How is the weather today?" received via the microphone 110 after receiving "Hi ABC" may be specified as a user speech that is an input of the speech recognition and natural language understanding model. In this example, a virtual assistant model may be configured to include a model recognizing at least a trigger word, a speech recognition model, and a natural language understanding model.

Hereinafter, reference to "a user speech" may refer to a user speech that is input to the speech recognition and natural language understanding model as a user speech received through the microphone 110, after the trigger input is received.

The non-volatile memory 120 refers to a memory capable of maintaining stored information even if power supply is stopped. For example, the non-volatile memory may include at least one of a flash memory, programmable read-only memory (PROM), magneto-resistive random-access memory (MRAM), or resistive RAM (RRAM).

The volatile memory 130 refers to a memory requiring continuous power supply to maintain stored information. For example, the volatile memory 130 may include at least one of dynamic random-access memory (DRAM) and static RAM (SRAM).

Hereinafter, it is assumed that the volatile memory 130 is a separate configuration from the processor 140, but this is to clearly describe an operation of the electronic device 100 according to an embodiment, and the volatile memory 130 may be implemented to be included in the processor 140 as a component of the processor 140 according to another embodiment.

The non-volatile memory 120 according to an embodiment may store data associated with a speech recognition model and a natural language understanding model. The data associated with the speech recognition model and the natural language understanding model stored in the non-volatile memory 120 may be loaded into the volatile memory 130. For convenience of description, data associated with a plurality of models to (e.g., required to) provide a virtual assistant service such as a speech recognition model and a natural language understanding model is referred to as "virtual assistant model data."

Specifically, a part of the virtual assistant model data can be classified into "data classified according to a plurality of domains." Here, the domain refers to a kind of category classified according to the type of the control command corresponding to the user speech or a theme of the user speech. For example, the plurality of domains may include domains such as "weather," "schedule," "message," "gallery," "settings," or the like. The data classified according to the plurality of domains may be constructed to be used for understanding a natural language through a natural language understanding (NLU) model as described below, and stored in the non-volatile memory 120 in the form of a database.

Meanwhile, another part of the virtual assistant model data can be classified into "data commonly used for a plurality of domains." Here, "commonly used for a plurality of domains" refers to data associated with a plurality of models used to perform speech recognition and natural language understanding of a user speech regardless of what domain corresponds to the user speech.

The plurality of models may include a Wake on Voice (WoV) model that recognizes a trigger word from a user speech, an automatic speech recognition (ASR) model that performs speech recognition, and a natural language understanding (NLU) model that performs natural language understanding, or the like, and each model may include a plurality of modules configured to perform the specific functions for (e.g., necessary for) speech recognition and natural language understanding. Thus, a description of a model according to the disclosure may be used in a sense including a description of a module included in the model.

A structure of the virtual assistant model data stored in the non-volatile memory 120 is described in greater detail below with reference to FIG. 2.

The processor 140 controls the overall operation of the electronic device 100. Specifically, the processor 140 may be connected to the components of the electronic device 100, including the microphone 110, the non-volatile memory 120, and the volatile memory 130, as described above, to control overall operations of the electronic device 100. The processor 140 may include at least one of a central processing unit (CPU), a graphic processing unit (GPU), a main processing unit (MPU), or the like.

The processor 140 may load the virtual assistant model data stored in the non-volatile memory 120 into the volatile memory 130. The loading is or includes an operation of calling, copying, or moving data stored in the non-volatile memory 120 to the volatile memory 130 and storing the same so that the processor 140 may access the data.

If data associated with a plurality of models for performing speech recognition and natural language understanding among the data stored in the non-volatile memory 120 is loaded into the volatile memory 130, the processor 140 can initialize the plurality of models. Initialization refers to a process that, when (or based on) the data associated with the plurality of models is loaded into the volatile memory 130 from the non-volatile memory 120, the data for (e.g., necessary for) performing the process of each of the plurality of models is called from the data associated with the plurality of models in a form of a resource or database. That is, the initialization is or includes reconfiguring the data stored in the non-volatile memory 120 to a form of an accessible file or database and stored in the volatile memory 130 so that a software program loaded to the memory 130 and executed may utilize the data stored in the non-volatile memory 120. Loading data associated with a plurality of models into the volatile memory 130 may include loading data associated with a plurality of models and then initializing a plurality of models.

If (or based on) data associated with a plurality of models is loaded into the volatile memory 130, the processor 140 can perform speech recognition and natural language understanding through a plurality of models. Specifically, when (or based on) user speech is received through the microphone 110, the processor 140 may perform speech recognition and acquire a text corresponding to the received user speech. When the text corresponding to the user speech is acquired, the processor 140 may acquire information on intention of the user by performing natural language understanding for the acquired text.

More specifically, if the signal for the user speech acquired through the microphone 110 is converted into a signal in a form of a digital signal and stored in the volatile memory 130 as described above, the processor 140 can acquire the text corresponding to the user speech using the signal stored in the volatile memory 130 as input data of the ASR model, and store the acquired text in the volatile memory 130. The processor 140 may acquire information on the intention of the user by using the text stored in the volatile memory 130 as input data of the NLU model. A plurality of models including the ASR model and the NLU model is described in greater detail below with reference to FIG. 2.

According to various embodiments, the processor 140 may efficiently control the process of loading the virtual assistant model data stored in the non-volatile memory 120 into the volatile memory 130 and the process of handling the user speech received through the microphone 110, which is described below with reference to FIGS. 3, 4A to 4C, 5, 6A to 6B, and 7 through 9. The structure of the data stored in the non-volatile memory 120 according to an embodiment will now be described with reference to FIG. 2.

Figure 2:
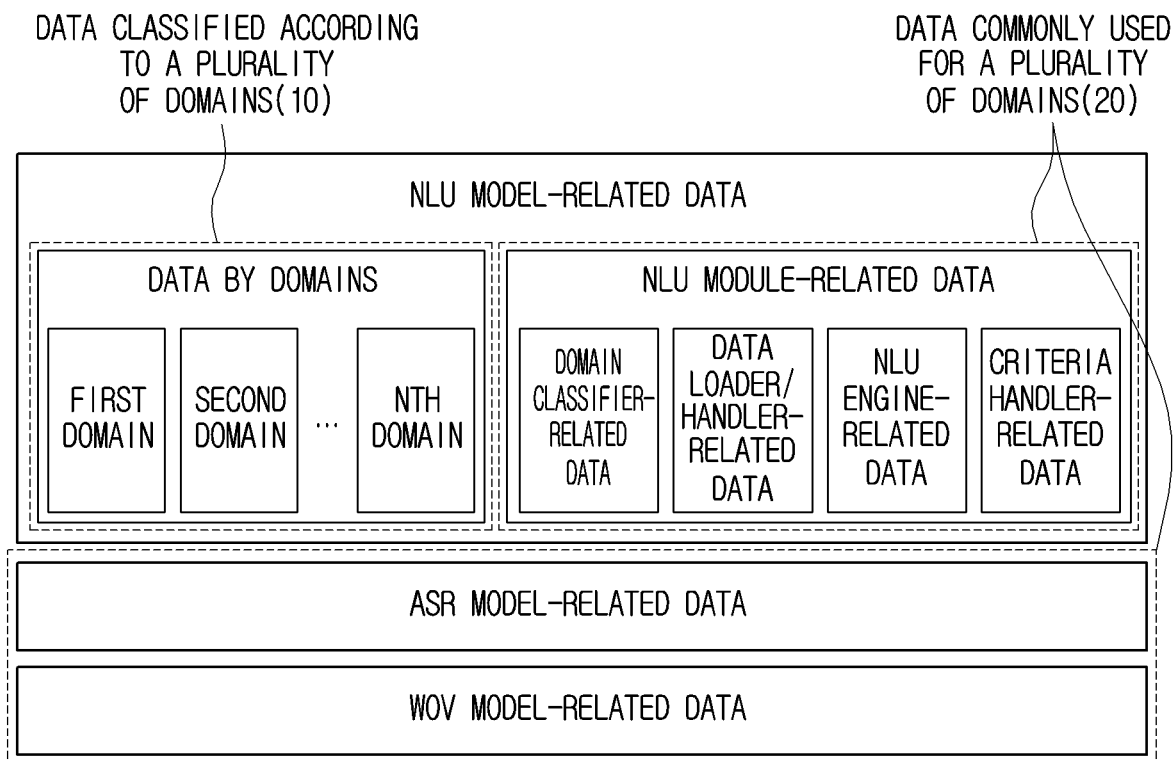
FIG. 2 is a mimetic diagram illustrating a structure of a virtual assistant model data stored in a non-volatile memory according to an embodiment.

FIG. 2 is a mimetic diagram illustrating a structure of a virtual assistant model data stored in a non-volatile memory 120 according to an embodiment.

Referring to FIG. 2, the virtual assistant model data stored in the non-volatile memory 120 may include data associated with the NLU model, data associated with the ASR model, and data associated with the WoV model. The NLU model-related data may be classified as "data by domains" such as data corresponding to a first domain, data corresponding to a second domain, data corresponding to a third domain, or the like. Further, "data associated with the NLU module" such as data associated with a domain classifier, data associated with data loader/handler, data associated with NLU engine, data associated with a criteria handler, or the like.

The data for each domain among the NLU model-related data can be classified according to a plurality of domains and thus can be distinguished from NLU module-related data among the NLU model-related data commonly used in a plurality of domains, ASR model-related data, and WoV model-related data. Accordingly, for convenience of description, data classified into data for each domain among the NLU model-related data and other data are referred to as "data 10 classified according to a plurality of domains" and "data 20 commonly used for a plurality of domains."

The electronic device 100 may perform speech recognition and natural language understanding for the user speech through a plurality of models and the plurality of models and a plurality of modules included in the plurality of models are described below.

The NLU model may include a plurality of modules such as the domain classifier, data loader, data handler, NLU engine, the criteria handler, or the like.

The domain classifier refers to a module for classifying a domain associated with user speech. The domain classifier may classify at least one domain, among the plurality of domains, associated with a user speech received through a microphone.

The data loader refers to a module that loads the data 10 distinguished according to a plurality of domains of the virtual assistant model data stored in the non-volatile memory 120 into the volatile memory 130. In particular, the data loader can selectively load data corresponding to at least one domain identified through the domain classifier into the volatile memory 130. The selective loading process according to the disclosure is described below.

The data handler refers to a module for processing data 10 distinguished according to a plurality of domains. Specifically, the data handler may convert the data 10 classified according to the plurality of domains into a graph format or serialize the data 10 into the referential data. For example, the data handler may generate an n-graph or a JavaScript object notation (JSON), or the like, based on the data loaded into the non-volatile memory 120. The data handler according to an embodiment can process data loaded into the volatile memory 130 through the data loader, among the data 10 classified according to a plurality of domains.

The NLU engine refers to a module that performs natural language understanding using data 10 classified according to a plurality of domains. Specifically, when (or based on) a text corresponding to the user speech is acquired through the ASR model as described below, the NLU engine may acquire information on the intention of the user corresponding to the user speech based on the acquired text. In addition, in acquiring information about the intention of a user by the NLU engine, the data 10 classified according to a plurality of domains, more specifically, data loaded into the volatile memory 130 by the data loader and processed by the data handler, may be used.

The NLU engine may be a rule or rule-based engine based on rule or may be a deep neural network (DNN) engine based on an artificial neural network. The NLU engine according an embodiment may be used to include both. The NLU engine can perform syntactic analysis and semantic analysis on the text acquired (or obtained) through the ASR model to acquire (or obtain) information on the intention of the user.

Specifically, the NLU engine may classify grammatical units (e.g., at least one of words, phrases, morphemes, etc.) of the acquired text and identify which grammatical element the classified grammatical units have. The NLU engine may determine the meaning of the text based on the identified grammatical element. The NLU engine may also acquire information about the user's intent by matching the determined meaning of the text to the identified domain, a plurality of intents included in the identified domain, and a plurality of parameters. For example, the NLU engine may acquire information about the user's intent by matching the determined meaning of the text to "alarm" that is the identified domain, "alarm setting" and "alarm release" which are a plurality of intents included in the identified domain, "time," "repetition times," "alarm sound," which are parameters to express the user's intent, or the like.

The criteria handler refers to a module that converts unstructured information included in the user speech into structured information. Specifically, if the unstructured information is included in the user speech, the criteria handler can acquire structured information corresponding to the unstructured information. For example, if the user speech includes unstructured information such as "Please let me know the weather of this Friday," the criteria handler may acquire information such as "year: 2019, month: 4, Day: 19, Week: Fri" as the structured information corresponding to the unstructured information. If the structured information corresponding to the unstructured information is acquired, the NLU engine may acquire the information on the user's intent based on the acquired structured information.

The ASR model refers to a model that performs speech recognition for the user speech. The ASR model may include at least one of an acoustic model (AM), a pronunciation model (PM), a language model (LM), or the like.

The AM may extract acoustic features of the received user speech and acquire a phoneme sequence. The PM may include a pronunciation dictionary (pronunciation lexicon), and map the acquired phoneme sequence to a word to acquire a word sequence. The LM may assign a probability to the acquired word sequence. That is, the ASR model can acquire a text corresponding to the user speech through an artificial intelligence (AI) model such as AM, PM, and LM. The ASR model may include an end-to-end speech recognition model where components of AM, PM and LM are combined into a single neural network.

The WoV model refers to a model for recognizing a trigger word from the user speech. The WoV model identifies (or determines) whether the received user speech includes a predetermined trigger word and if it is identified (or based on identifying or determining) that the user speech includes a predetermined trigger word, it may be determined that the speech recognition is performed for the user speech received through a microphone after the trigger word is received.

The process of performing various operations according to one or more embodiments using the virtual assistant model data as described above can be controlled by a flow controller. The flow controller refers to a module that controls the loading process and the overall operation of data processing to control the associated software modules. Specifically, the flow controller may be loaded into the volatile memory 130 prior to loading the virtual assistant model data as shown in FIG. 2 to determine the loading order and loading target data of the virtual assistant model data, load the virtual assistant model data into the volatile memory 130, and perform various operations through the plurality of models and the plurality of modules. The flow controller is described in greater detail below with reference to FIG. 5.

As described above, the data associated with the plurality of models and the plurality of modules may include software data and/or instructions implemented as a programming language to execute the plurality of models and the plurality of modules. At least one of the plurality of models and the plurality of modules may be implemented through the AI model.

The plurality of models and functions of each of the plurality modules included in the plurality of models have been described, but this is only to clarify and describe various embodiments, and the disclosure is not limited to the names and classification criteria assumed as above.

Various embodiments will be described based on the descriptions of the structure of the data and the plurality of modules.

Figure 3:
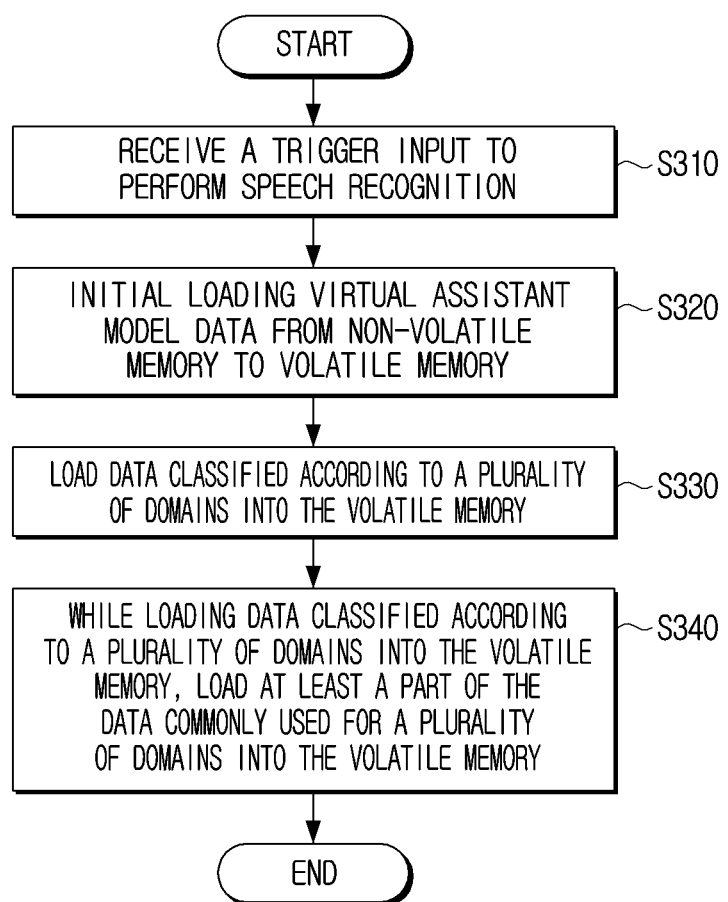
FIG. 3 is a flowchart illustrating a process of controlling an electronic device 100 according to an embodiment.

FIG. 3 is a flowchart illustrating a process of controlling an electronic device 100 according to an embodiment.

Referring to FIG. 3, the electronic device 100 may receive a trigger input (e.g., predetermined trigger, phrase, word, etc.) for performing speech recognition in operation S310. In the description of FIG. 1, a user speech including a predetermined trigger word is described as an example of the trigger input, but the trigger input is not limited thereto. Various types of trigger inputs are described below with reference to FIG. 9.

Once (or based on) the trigger input is received, the electronic device 100 may initiate loading the virtual assistant model data from the non-volatile memory 120 into the volatile memory in operation S320. Specifically, when a trigger input is received, the electronic device 100 may initiate loading the data associated with the NLU model and the ASR model stored in the non-volatile memory to the volatile memory through the module for loading the virtual assistant model data stored in the non-volatile memory into the volatile memory. In the process of loading various data included in the virtual assistant model data, various embodiments as described below can be applied.

Initiating loading the data associated with the ASR model and the NLU model into volatile memory is not limited to loading all the data associated with the ASR model and the NLU model into volatile memory. That is, the disclosure can be applied to a case where some of the data associated with the ASR model and the NLU model are previously loaded into the volatile memory before the trigger input is received, and others among the data associated with the ASR model and the NLU model that have not been loaded into the volatile memory are loaded to the volatile memory with the condition of (or based on) receiving the trigger input.

The electronic device 100 may load the data classified according to a plurality of domains into the volatile memory in operation S330. When (or based on) the data associated with the data loader, among the virtual assistant model data, is loaded to the volatile memory after loading of the virtual assistant model data is initiated in operation S320, the electronic device 100 may load the data classified in accordance with the plurality of domains to the volatile memory through the data loader.

According to an embodiment, the electronic device 100 may selectively load some of the data classified according to a plurality of domains into the volatile memory. Here, selectively loading a part of data classified according to a plurality of domains means or includes loading only data associated with a user speech received through a microphone among data classified according to a plurality of domains, which is described in detail below with respect to a process of selective loading of data classified according to a plurality of domains from the receiving of the user speech.

Specifically, after the trigger input to perform speech recognition is received in operation S310, the electronic device 100 may receive the first user speech via the microphone. If the data associated with the ASR model of the virtual assistant model data is loaded into the volatile memory after the loading of the virtual assistant model data is initiated in operation S320, the electronic device 100 can acquire a first text corresponding to the first user speech using the first user speech as the input data of the ASR model. The user speech received via the microphone 110 is referred to herein as the first user speech for convenience of description, to distinguish from a second user speech described below with reference to FIGS. 6A to 6B and 7 through 8.

When (or based on) the data associated with the domain classifier among the virtual assistant model data is loaded into the volatile memory, the electronic device 100 can identify at least one domain associated with the first user speech of the plurality of domains by using the acquired first text as input data of the domain classifier. If at least one domain associated with the first user speech is identified, the electronic device 100 may load data corresponding to the at least one domain identified as being associated with the first user speech of the data classified according to the plurality of domains into the volatile memory.

While the data classified according to the plurality of domains is being loaded into the volatile memory, the electronic device 100 may load at least a part of the data commonly used in the plurality of domains into the volatile memory in operation S340. In other words, the electronic device 100 can load at least some of the data commonly used in a plurality of domains along with data classified according to a plurality of domains in parallel after loading data classified according to a plurality of domains into volatile memory in parallel. For example, while loading data classified according to a plurality of domains into volatile memory, the electronic device 100 may load data associated with the ASR model of the data commonly used in the plurality of domains into volatile memory.

According to an embodiment, after at least one domain associated with a first user speech of data 10 classified according to a plurality of domains is identified as described above, data corresponding to the identified at least one domain is loaded into the volatile memory. While loading data corresponding to the identified domain, the electronic device 100 may load at least some of the data commonly used in the plurality of domains into volatile memory. For example, the electronic device 100 may load at least some of the data associated with the NLU engine among the data commonly used in the plurality of domains into volatile memory while loading data corresponding to the identified at least one domain into the volatile memory.

Figure 4A:
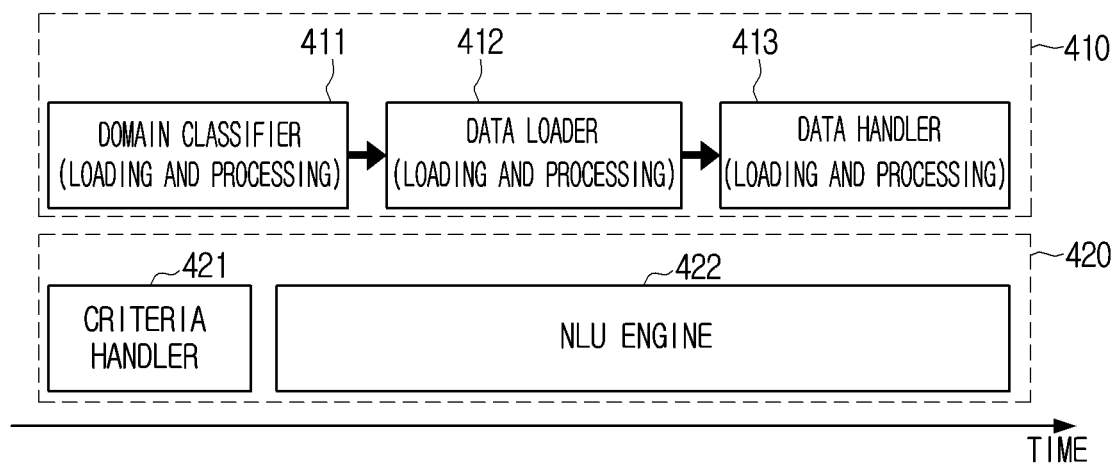
FIGS. 4A to 4C are diagrams illustrating various embodiments related to a process of loading virtual assistant model data according to an embodiment.
Figure 4B:
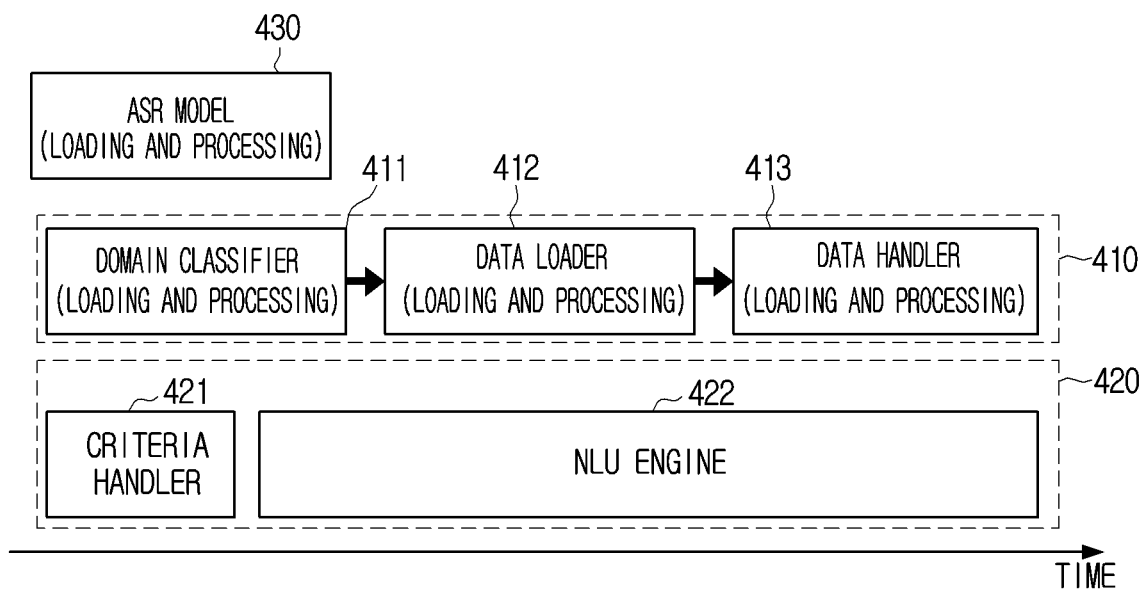
Figure 4C:
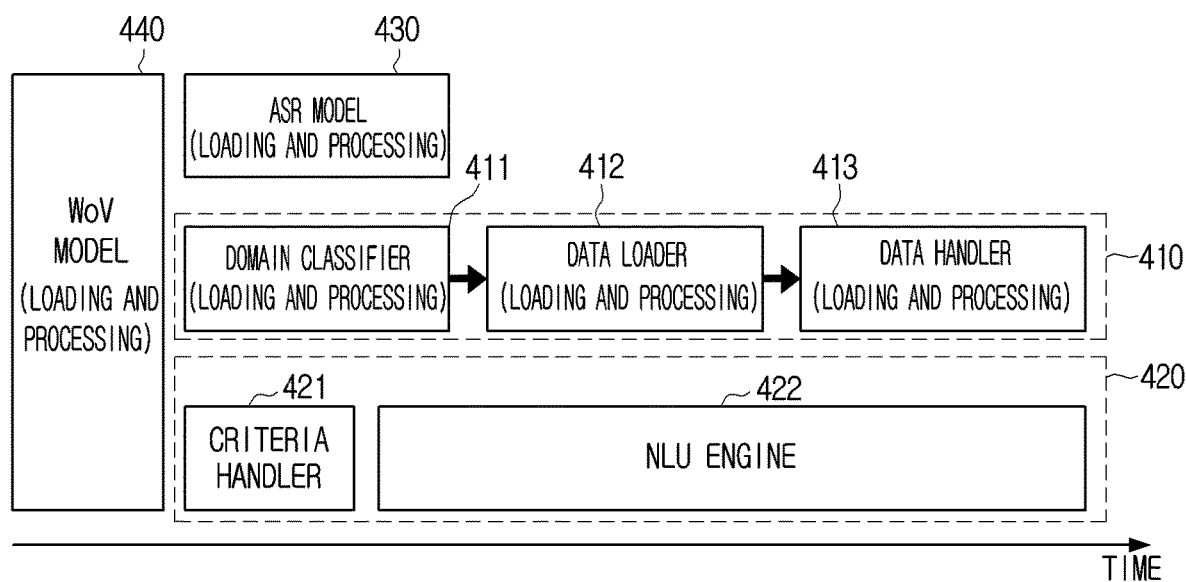

With reference to FIGS. 4A to 4C, various embodiments of parallel loading and selective loading of the virtual assistant model data are described more specifically.

FIGS. 4A to 4C are diagrams illustrating various embodiments related to a process of loading virtual assistant model data according to an embodiment.

FIGS. 4A to 4C illustrate a parallel loading process of virtual assistant model data according to various embodiments based on a coordinate axis of time, a plurality of models, and a process of processing through a plurality of models as a type of a block corresponding to each model and module. The length of each block is approximately illustrated according to one embodiment, and the loading process and model of the model and module according to the disclosure and the time of the processing through the model and model do not necessarily correspond to the length of the block as shown in FIGS. 4A to 4C.

FIG. 4A is a diagram illustrating a parallel loading process between a plurality of modules included in the NLU model. As illustrated in FIG. 4A, the NLU model includes a domain classifier 411, a data loader 412, a data handler 413, a criteria handler 421, and an NLU engine 422.

As described above with reference to FIG. 3, the electronic device 100 may load at least some of the data commonly used in a plurality of domains into volatile memory while loading data corresponding to at least one domain identified as corresponding to a user speech into volatile memory. For example, as shown in FIG. 4A, the electronic device 100 selectively loads data corresponding to at least one domain identified as associated with user speech from among data classified according to a plurality of domains through a data loader 412 into volatile memory. During loading of the data corresponding to the identified domain, data associated with the NLU engine among the data commonly used in the plurality of domains may be loaded to the volatile memory in parallel.

The electronic device 100 may first load the data associated with the domain classifier 411 into the volatile memory and identify at least one domain corresponding to the user speech through the domain classifier 411 to selectively load the data corresponding to the identified domain to the volatile memory.

While the parallel loading between data classified according to a plurality of domains and data commonly used in a plurality of domains has been described above, the electronic device 100 according to one or more other embodiments may load some of the data commonly used in a plurality of domains and some other data into volatile memory in parallel.

For example, as shown in FIG. 4A, the electronic device 100 may load data associated with the criteria handler 422 and data associated with the NLU engine in parallel while loading the data associated with the domain classifier 411 into the volatile memory. The electronic device 100 may also load data associated with the NLU engine in a volatile memory in parallel while loading the data loader 412 into the volatile memory. The electronic device 100 may load data associated with the NLU engine among the data commonly used in the plurality of domains into the volatile memory while loading the data handler 413 into the volatile memory.

While the data loading process has been mainly described above, it is understood that the electronic device 100 may load at least one of the data commonly used in a plurality of domains to the volatile memory in parallel while performing a handling process through a plurality of models and a plurality of modules.

For example, the data associated with the criteria rule handler 422 and the data associated with the NLU engine can be loaded into the volatile memory while performing the process of the domain classifier 411 as well as the loading process of the domain classifier 411. While running the data common to the plurality of domains loaded to the volatile memory through the data handler 413, data associated with the NLU engine may be loaded to the volatile memory.

As described above, when at least one domain associated with the user speech is identified through the domain classifier 411, the data loader 412 and the data handler 413 may perform loading and processing depending on the identified domain. In this regard, the data loader 412 and the data handler 413 may be referred to as "a module dependent on the domain classifier 411." Among the plurality of modules included in the NLU model, the criteria handler 421 and the NLU engine 422 may not be (e.g., may have little need to be) loaded into the volatile memory by being dependent on the domain classifier 411, and pre-loading may be desirable during the loading and processing associated with the domain classifier 411. In this sense, the rest of the modules except the domain classifier 411, data loader 412, and the data handler 413 may be referred to as "a module not dependent on the domain classifier 411."

Referring to FIG. 4A, the electronic device 100 may load data associated with the domain classifier 411 and at least one module among the modules 410 dependent on the domain classifier 411 into the volatile memory, and while performing the processing through each module, the electronic device 100 may load the data associated with at least one of the modules 420 non-dependent on the domain classifier 411 into the volatile memory. An embodiment of the parallel loading between the module dependent on the domain classifier 411 and the module not dependent on the domain classifier 411 may likewise be applied to an example in which a module dependent on the domain classifier 411 and a module not dependent on the domain classifier 411 include modules different from the example illustrated in FIG. 4A.

There is no mutually sequential relationship between the criteria handler 421 and the NLU engine 422 among the plurality of modules included in the NLU model, and the embodiment as shown in FIG. 4A is only one embodiment of various embodiments according to the disclosure. For example, according to another embodiment, the electronic device 100 may load data associated with the criteria handler 421 to the volatile memory while loading the data associated with the data loader 412 or the data associated with the data handler 413 into the volatile memory.

FIG. 4B includes loading and handling processes of the ASR model 430, in addition to the loading and handling process of the NLU model described in FIG. 4A, according to an embodiment.

As described above with reference to FIG. 4A, the electronic device 100 can identify at least one domain corresponding to a user speech through the domain classifier 411. However, in order to perform the process of the domain classifier 411, a process of processing an ASR model 430 may be (e.g., needs to be) performed beforehand. Thus, before at least one domain corresponding to the user speech is identified through the domain classifier 411, the electronic device 100 can load data associated with the ASR model 430 into the volatile memory and acquire a text corresponding to the user speech through the ASR model 430. When (or based on) a text corresponding to the user speech is acquired (or obtained) through the ASR model 430, the electronic device 100 can input the acquired text to the domain classifier 411 to identify at least one domain corresponding to the user speech.

While loading data associated with the ASR model 430 into the volatile memory and acquiring a text corresponding to the user speech through the ASR model 430, the electronic device 100 can load, to the volatile memory, data associated with the domain classifier 411 in parallel. In other words, so that the handling process of the domain classifier 411 is performed when (or based on) the text according to the handling result of the ASR model 430 is acquired, the electronic device 100 can load the data associated with the domain classifier 411 into the volatile memory before the loading process of the data associated with the ASR model and the handling process of the ASR model are completed. Although FIG. 4B illustrates that the data associated with the ASR model 430 and the loading process of data associated with the domain classifier 411 are initiated at the same time, it is understood that one or more other embodiments are not limited thereto.

Meanwhile, as shown in FIG. 4B, various embodiments associated with the loading process of the NLU model as described with reference to FIG. 4A can be applied in an overlapped manner, while the loading process of the data associated with the ASR model and the processing of the ASR model are performed. For example, as shown in FIG. 4B, while the loading process of the data associated with the ASR model and the processing of the ASR model are performed, the electronic device 100 may load data associated with the criteria handler 422 and data associated with the NLU engine in parallel to the volatile memory, along with the data associated with the domain classifier 411.

FIG. 4C includes loading and handling processes of the WoV model 440 to further describe an embodiment.

As described above, the WoV model 440 refers to a model for recognizing a trigger word from the user speech. The WoV model may identify whether the user speech includes a predetermined trigger word, and if (or based on) it is identified that the user speech includes a predetermined trigger word, it may be determined that speech recognition is performed for the user speech received through a microphone after the trigger word is received.

If the user speech is identified as including a predetermined trigger word, the WoV model 440 may call an initializer as described below to initiate loading data associated with the ASR model 430 and the NLU model 410, 420 stored in the non-volatile memory 120 into the volatile memory 130. For this purpose, the WoV model 440 may be loaded into the volatile memory prior to the ASR model 430 and the NLU model.

In particular, when the electronic device 100 is turned on and thus an operating system (OS) for driving the electronic device is loaded, the electronic device 100 can load data associated with the WoV model 440 into volatile memory. That is, the electronic device 100 according to an embodiment can separately classify the WoV model 440 having less usage memory and resources from the ASR model 430 and the NLU model 440, and pre-load the WoV model 440 to the background before the trigger input is received. It is understood, however, that one or more other embodiments are not limited thereto, and the WoV model 440 may be loaded into the volatile memory in response to (or based on) receiving the trigger input.

In FIGS. 4A to 4C, it has been illustrated that up to three processes, among the process of loading data associated with a plurality of modules and the process of handling according to each of a plurality of modules, are processed in parallel. It is understood, however, that this is just one example, and one or more other embodiments are not limited thereto and more processes can be handled in parallel, depending on a bandwidth between non-volatile memory and volatile memory.

Figure 5:
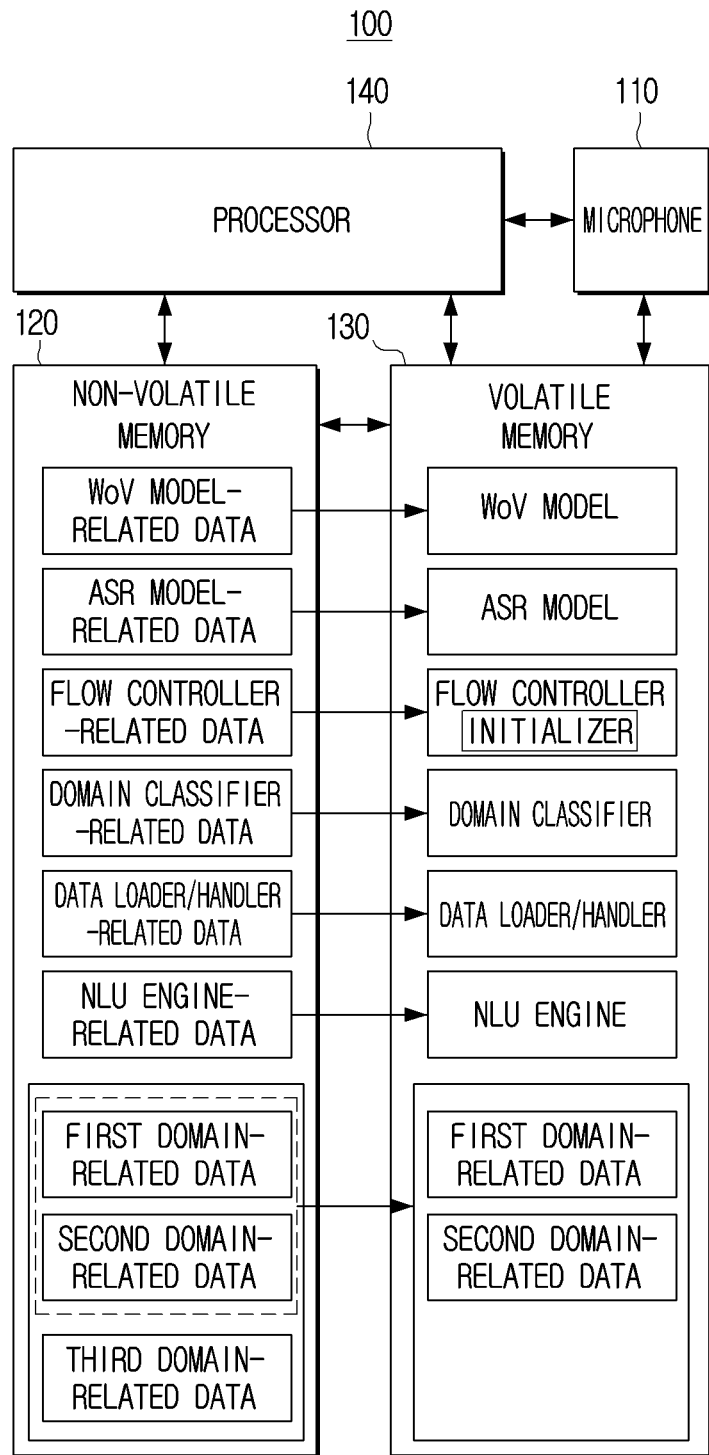
FIG. 5 is a diagram illustrating a detailed configuration of an electronic device according to an embodiment.

FIG. 5 is a diagram illustrating a detailed configuration of an electronic device 100 according to an embodiment.

As described above, the non-volatile memory 120 may store virtual assistant model data, and the virtual assistant model data may include both the data classified according to a plurality of domains and data commonly used for the plurality of domains.

The processor 140 may load the virtual assistant model data stored in the non-volatile memory 120 into the volatile memory 130 and access the virtual assistant model data loaded into the volatile memory 130. Specifically, the processor 140 may load, into the volatile memory 130, data associated with a plurality of models for performing voice recognition and natural language understanding among data stored in the non-volatile memory 120, initialize a plurality of models loaded in the volatile memory 130, and perform speech recognition and natural language understanding through the plurality of models.

The processor 140 may load the data associated with a flow controller stored in the non-volatile memory 120 into the volatile memory 130 and control overall operations through the flow controller. That is, the flow controller refers to a module that controls overall operations associated with data loading process and data handling process and can be referred to as a flow control module, or the like.

The flow controller may determine a loading order and loading target data of the virtual assistant model data. The flow controller may include an initializer and may load data stored in the non-volatile memory 120 into the volatile memory 130 through the initializer. That is, the initializer may refer to a module that loads data stored in the non-volatile memory 120 into the volatile memory 130, and may also be referred to as a loader, an initialization module, or the like.

The flow controller may call a plurality of modules to perform operations of each of the plurality of modules, receive a response corresponding to the call from a plurality of modules, and control various operations by calling a plurality of modules again based on the received response.

Here, loading refers to an operation in which data stored in the non-volatile memory 120 is retrieved and stored in the volatile memory 130 to be accessible by the processor 140. Specifically, the processor 140 may identify target data to be loaded among the virtual assistant model data stored in the non-volatile memory 120 based on indexing information and/or addressing information stored in the non-volatile memory 120 through the flow controller. The processor 140 can load the data stored in the non-volatile memory 120 into the volatile memory 130 by reading data identified as being loaded through the initializer and writing the read data into the volatile memory 130.

The volatile memory 130 may be implemented as, for example, a dynamic random-access memory (DRAM). The DRAM includes a plurality of cells, and each of the plurality of cells may include a transistor serving as a switch and a capacitor storing bit data. The processor 140 may control a transistor included in each of a plurality of cells of the DRAM, thereby performing a writing or reading operation by charging or discharging electrons in a capacitor corresponding to each transistor.

A process of controlling the operations of the electronic device 100 by the processor 140 according to an embodiment by calling a plurality of modules through the flow controller is further described below.

The processor 140 may receive a trigger input to perform a voice recognition. When (or based on) the trigger input is received, the processor 140 may determine whether to perform speech recognition through the WoV model.

According to an embodiment, the processor 140 may individually classify the WoV model with low usage of memory and resource from the ASR model and the NLU model, to load the WoV model into the background before the trigger input is received. That is, if the electronic device 100 is turned on and thus an operating system (OS) for driving the electronic device is loaded, the processor 140 can load data associated with the WoV model into the volatile memory 130.

If a trigger input is received, then the WoV model may determine to perform speech recognition for the user speech received through the microphone 110 after the trigger input is received. If it is determined that speech recognition is (or is to be) performed on the user speech received through the microphone 110 after the trigger input is received, the WoV model can call the initializer as described above to initiate loading the virtual assistant model data stored in the non-volatile memory 120 into the volatile memory 130.

In other words, if a trigger input is received, the processor 140 may initiate loading the virtual assistant model data from the non-volatile memory 120 into the volatile memory 130. Specifically, when a trigger input is received, the electronic device 100 may initiate loading the data relating to the ASR model and the NLU model stored in the non-volatile memory through the module for loading the virtual assistant model data stored in the non-volatile memory into the volatile memory. In addition, in the process of loading various data included in the virtual assistant model data, various embodiments as described below can be applied.

The processor 140 may load the data classified according to a plurality of domains into the volatile memory 130 and, while the data classified according to a plurality of domains is loaded into the volatile memory 130, at least a part of the data commonly used for the plurality of domains into the volatile memory 130.

The processor 140 may load at least some of the data commonly used in a plurality of domains along with data classified according to a plurality of domains into the volatile memory 130 in parallel, rather than loading data that is commonly used in the plurality of domains after loading the data classified according to a plurality of domains. A parallel loading process of virtual assistant model data according to an embodiment is described in more detail below.

The processor 140 may receive a first user speech through the microphone 110. If (or based on) the first user speech is received, the processor 140 may acquire the first text through the ASR model. The ASR model may acquire the first text corresponding to the first user speech by performing the speech recognition for the first user speech.

If (or based on) the first text corresponding to the first user speech is acquired (or obtained), the processor 140 may identify at least one domain associated with the first user speech through the domain classifier. For example, as shown in FIG. 5, the data classified according to a plurality of domains may include first domain related data, second domain related data, and third domain related data, and the domain classifier can identify a first domain and a second domain as at least one domain associated with the first user speech.

The at least one domain associated with the first user speech refers to a domain that is highly likely to be associated with the first user speech among the plurality of domains. If the first text corresponding to the first user speech is acquired, the domain classifier may identify n domains having high probability of being associated with the first user speech based on the first text. Here, n may be predetermined in consideration of accuracy of natural language understanding, data loading time, or the like.

If at least one domain associated with the first user speech is identified, the processor 140 may load data corresponding to the at least one domain identified as associated with the first user speech of the classified data according to the plurality of domains into the volatile memory 130. The processor 140 may load data associated with the data manager into the volatile memory 130 and, via the data loader, the processor 140 may load data corresponding to the at least one domain identified as being associated with the first user speech of the classified data according to the plurality of domains to the volatile memory 130. For example, if the first domain and the second domain are identified as at least one domain associated with the first user speech, the processor 140 may load data corresponding to the first and second domains of data classified according to the plurality of domains into the volatile memory 130.

While loading data corresponding to the identified at least one domain into the volatile memory 130, the processor 140 may load at least some of the data commonly used in the plurality of domains into the volatile memory 130. For example, while loading data corresponding to the first and second domains of data classified according to a plurality of domains into the volatile memory 130, the processor 140 may load at least some of the data associated with the NLU engine into the volatile memory 130.

If (or based on) data corresponding to a domain identified as being associated with a first user speech of data classified according to a plurality of domains is loaded into the volatile memory, the processor 140 can process the loaded data. Specifically, the processor 140 can load data associated with the data handler into the volatile memory and process data corresponding to the domain identified as being associated with the first user speech of the data classified according to the plurality of domains through the data handler.

If (or based on) data corresponding to the domain identified as being associated with the first user speech is processed, the processor 140 can perform natural language understanding of the first text based on the processed data. The processor 140 can load data associated with the NLU engine, perform natural language understanding of the first text corresponding to the first user speech through the NLU engine, and acquire information on the intention of the user corresponding to the first user speech.

The processor 140 may load the data associated with the criteria handler among the data stored in the non-volatile memory 120 and convert the unstructured information included in the first user speech to structured information through the criteria handler.

A plurality of models for the processor 140 to perform speech recognition and natural language understanding and the process for performing various operations through the plurality of models have been described above, but it is understood that the plurality of models and names and functions of each of the plurality of models may vary depending on the design within the scope of achieving the objectives of the disclosure. The plurality of models and at least two of the plurality of modules may be implemented as combination in an end-to-end manner, in which case one or more embodiments may be applied within the scope of achieving the objectives of the disclosure.

Moreover, the speech recognition and natural language understanding process for the received user speech have been described above, but it is understood that a natural language generation process for acquiring a response corresponding to the user speech can be performed based on the result of speech recognition and natural language understanding according to the disclosure, and further, a text-to-speech (TTS) process for converting the acquired response into the form of output speech may be performed.

According to various embodiments as described above, the virtual assistant model data, that is, the data for performing speech recognition and natural language understanding, may be loaded in parallel, and the entire process of speech recognition and natural language understanding may be processed (or performed) efficiently.

By loading only the data corresponding to the domain identified as being associated with the received user speech into the volatile memory 130, without loading all of the data classified according to the plurality of domains into the volatile memory 130, the data loading time may be shortened. Since the amount of the reference data is reduced in the process of performing natural language understanding, the time of the natural language understanding process can also be shortened.

By loading the WoV model into the volatile memory 130 in advance if the electronic device is turned on, the speed of handling the electronic device 100 for the user speech may be further improved.

Figure 6A:
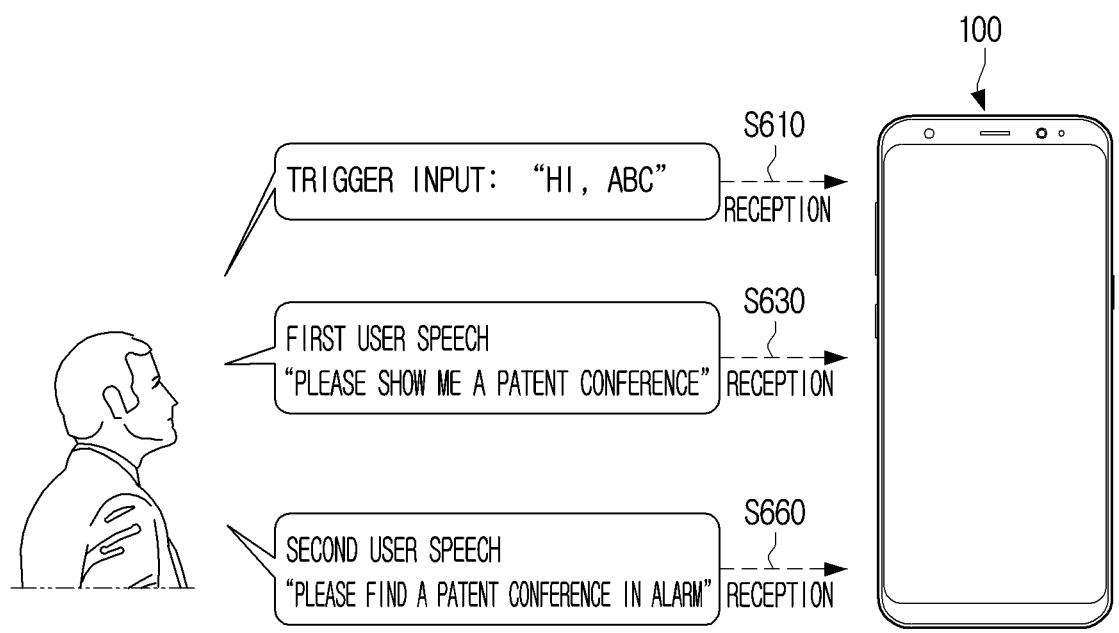
FIGS. 6A and 6B are diagrams illustrating an embodiment associated with an example where a trigger input, a first user speech, and a second user speech are sequentially received.
Figure 6B:
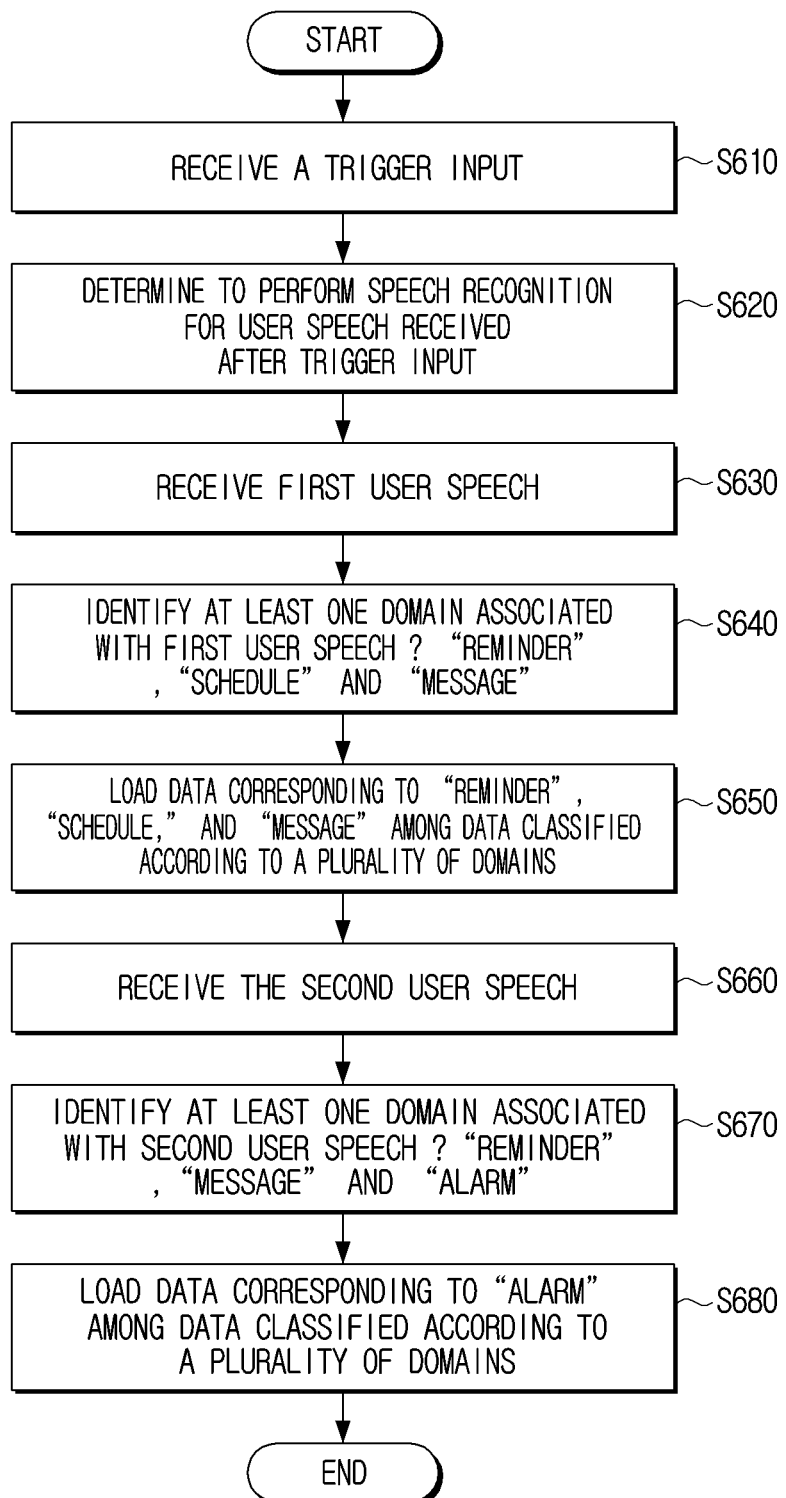
Figure 7:
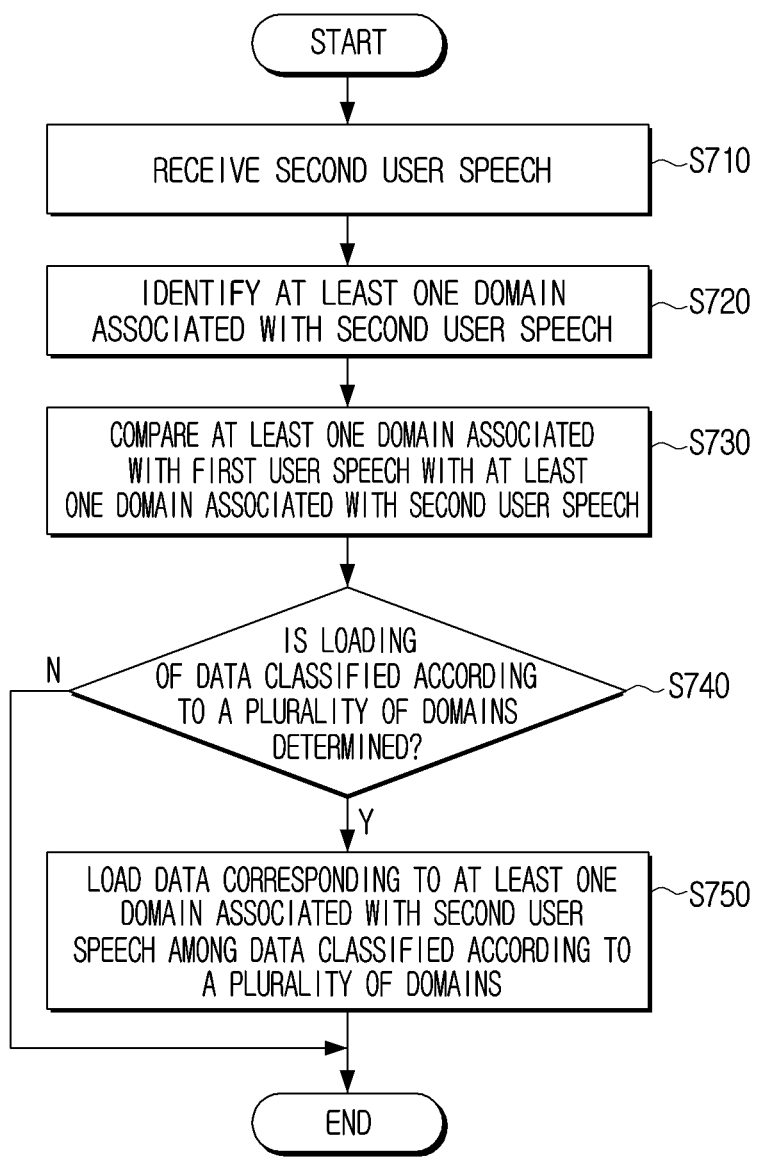
FIG. 7 is a flowchart illustrating in greater detail a process of determining whether to load data classified according to a plurality of domains by comparing at least one domain associated with a first user speech and at least one domain associated with a second user speech, based on the first user speech being received and then the second user speech being sequentially received.

With reference to FIGS. 6A to 6B and 7, an embodiment in which the first user speech is received and then the second user speech is received is described. Hereinbelow, redundant descriptions with those provided above with reference to FIGS. 1 to 3, 4A to 4C, and 5 may be omitted below.

FIGS. 6A and 6B are diagrams illustrating an embodiment associated with an example where a trigger input, a first user speech, and a second user speech are sequentially received.

Specifically, FIG. 6A is a diagram illustrating a specific example of a trigger input, a first user speech, and a second user speech received in the electronic device 100, and FIG. 6B is a flowchart illustrating a process of handling, by the electronic device 100, a trigger input, a first user speech, and a second user speech.

Referring to FIG. 6A, the electronic device 100 may receive a trigger input through a microphone in operation S610. If (or based on) the trigger input is received, the electronic device 100 may determine to perform speech recognition for the user speech received through the microphone after the trigger input is received in operation S620.

For example, as shown in FIG. 6A, the electronic device 100 may receive a trigger input that includes a predetermined trigger word, such as a "Hi, ABC," via a microphone. The electronic device 100 may determine to perform speech recognition on the first user speech and the second user speech received via the microphone after the trigger input is received.

After the trigger input is received (or together with receipt of the trigger input), the electronic device 100 may receive the first user speech via the microphone in operation S630. If (or based on) the first user speech is received, the electronic device 100 can acquire a first text corresponding to the first user speech and identify at least one domain associated with the first user speech based on the acquired first text in operation S640. If (or based on) at least one domain associated with the first user speech is identified, the electronic device 100 can load data corresponding to at least one domain identified as being associated with a first user speech of data classified according to a plurality of domains into the volatile memory in operation S650.

For example, the electronic device 100 may receive, as a first user speech, "Please show me a patent conference." If the first user speech is received, the electronic device 100 may acquire a first text corresponding to the first user speech and identify the domain "reminder," "schedule," and "message" as at least one domain associated with the first user speech based on the acquired first text. If (or based on) the domains of "reminder," "schedule," and "message" are identified, the electronic device 100 may selectively load data corresponding to the domains "reminder," "schedule," and "message" among the data classified according to the plurality of domains into the volatile memory.

After the first user speech is received, the electronic device 100 may receive a second user speech via a microphone in operation S660. The second user speech may be user speech generated by the user's utterance after the response of the electronic device 100 to the first user speech is output. For example, the second user speech may be user speech generated by the user's utterance after the response "What is the title of the schedule?" of the electronic device 100 to the first user speech, "Please show me the patent conference" has been output.

If (or based on) the second user speech is received, the electronic device 100 may acquire a second text corresponding to the second user speech, and identify at least one domain associated with the second user speech based on the acquired second text in operation S670 in the same manner as the example of receiving the first user speech, and load data corresponding to at least one domain identified as being associated with the second user speech of the data classified according to the plurality of domains in operation S680.

For example, as illustrated in FIG. 6A, the electronic device 100 may receive a second user input of "Please find a patent conference in alarm." If the second user speech is received, the electronic device 100 may acquire a second text corresponding to the second user speech. The electronic device 100 may identify the domains of "reminder," "schedule," and "alarm" as at least one domain associated with the second user speech based on the acquired second text.

In this example, the domain "reminder" and "schedule" of the at least one domain identified as being associated with the second user speech is included in at least one domain identified as being associated with the first user speech. Therefore, if the data corresponding to the domain "reminder" and "schedule" are maintained in the volatile memory according to the plurality of domains, the electronic device 100 does not have to additionally load data corresponding to the domain "reminder" and "schedule" among the data classified according to the plurality of domains. Thus, selectively loading data corresponding to the domain "alarm" only, among data classified according to the plurality of domains, is efficient.

According to an embodiment, the electronic device 100 may selectively load only the data corresponding to a domain not included in at least one domain associated with the first user speech among at least one domain associated with the second user speech among the data classified according to a plurality of domains. The embodiments with reference to FIGS. 6A and 6B will be further described with reference to FIGS. 7 and 8.

FIG. 7 is a flowchart illustrating a process of determining whether to load data that is classified according to a plurality of domains by comparing at least one domain associated with the first user speech and at least one domain associated with the second user speech, when (or based on) the first user speech is received and then the second user speech is sequentially received.

As described above, the electronic device 100 may receive a first user speech and identify at least one domain associated with the received first user speech. When (or based on) at least one domain associated with a first user speech is identified, the electronic device 100 can load data corresponding to at least one domain associated with a first user speech of data classified according to a plurality of domains into the volatile memory.

If data corresponding to at least one domain associated with a first user speech of data classified according to a plurality of domains is loaded into the volatile memory, the electronic device 100 can maintain data corresponding to at least one domain associated with the loaded first user speech in the volatile memory for a predetermined period of time. Hereinafter, an example where data corresponding to at least one domain associated with the first user speech is maintained in the volatile memory is described. A method for maintaining the data in the volatile memory and a method for determining a predetermined period for maintaining the data is described below with reference to FIG. 8.

As illustrated in FIG. 7, the electronic device 100 may receive a second user speech in operation S710. After the first user speech is received, the electronic device 100 may receive a second user speech via a microphone. If (or based on) the second user speech is received, the electronic device 100 may acquire or obtain a second text corresponding to the second user speech. If (or based on) the second text corresponding to the second user speech is acquired, the electronic device 100 can identify at least one domain associated with the second user speech based on the acquired second text in operation S720.

If (or based on) at least one domain associated with the second user speech is identified, the electronic device 100 may compare at least one domain associated with the first user speech with the at least one domain associated with the second user speech in operation S730. Specifically, the electronic device 100 may compare at least one domain associated with a first user speech with at least one domain associated with a second user speech to identify whether at least one domain associated with the second user speech is included in at least one domain associated with the first user speech.

As a result of (or based on) the comparison between the at least one domain associated with the first user speech and the at least one domain associated with the second user speech, the electronic device 100 may determine whether to load the data classified according to a plurality of domains in operation S740.

If (or based on) it is determined that the data classified according to a plurality of domains is not loaded in operation S740-N, the electronic device 100 may not load data corresponding to at least one domain associated with a second user speech of data classified according to a plurality of domains. Specifically, if at least one domain associated with the second user speech is identified as being included in at least one domain associated with the first user speech, the electronic device 100 may not further load the data classified according to the plurality of domains into the volatile memory.

If it is determined that data classified according to a plurality of domains is loaded in operation S470, the electronic device 100 can load data corresponding to at least one domain associated with a second user speech of data classified according to a plurality of domains in operation S750. Specifically, if it is identified that there is a domain not included in at least one domain associated with a first user speech of the at least one domain associated with a second user speech, the electronic device 100 may load data, among data classified according to a plurality of domains, which corresponds to at least one data associated with the second user speech and is different from the data that is maintained in the volatile memory.

The electronic device 100 may identify a domain, among at least one domain associated with the second user speech, not included in at least one domain associated with the first user speech as a new domain, and selectively load only the data corresponding to the identified new domain, among the data classified according to a plurality of domains, into the volatile memory.

Figure 8:
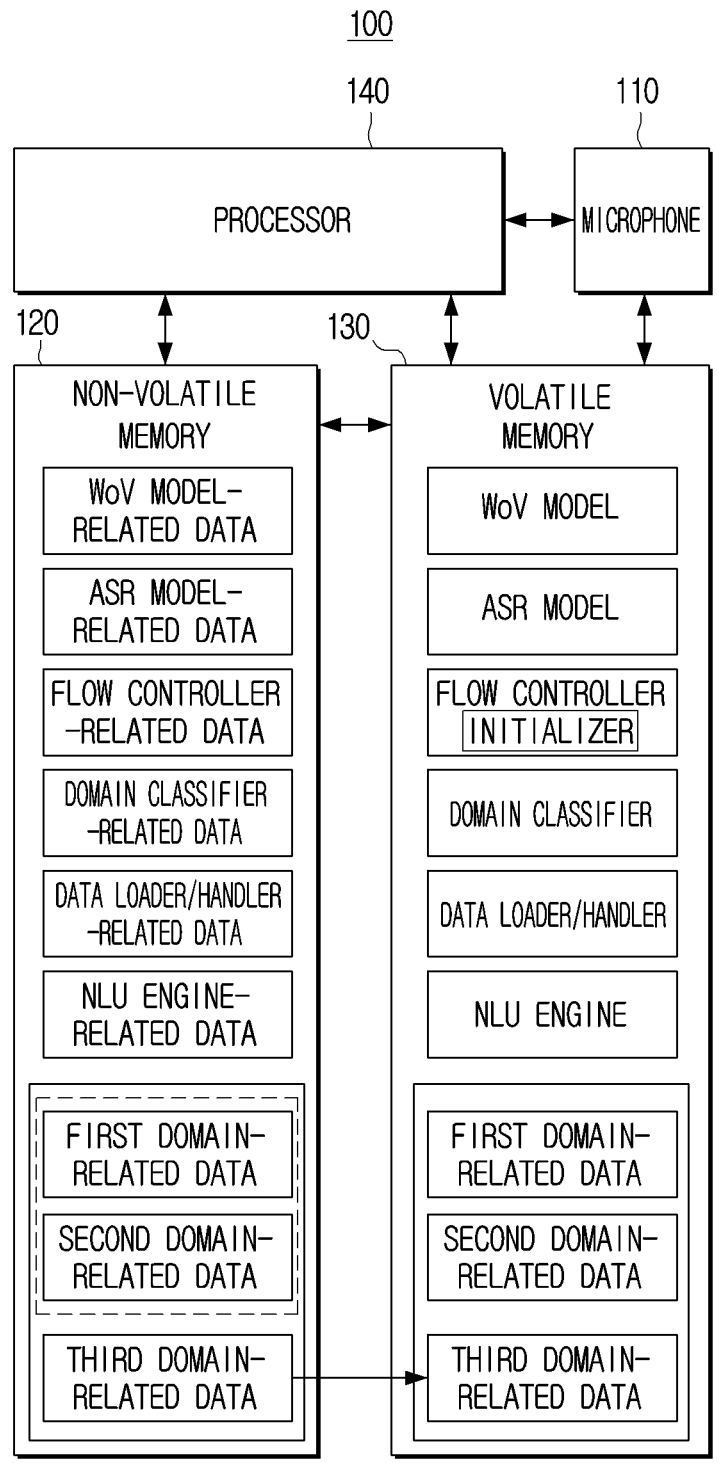
FIG. 8 is a diagram illustrating a process of handling second user speech by an electronic device according to an embodiment based on a first user speech being received and then a second user speech being sequentially received.

FIG. 8 is a diagram illustrating a process of handling the second user speech by an electronic device 100 according to an embodiment, based on a first user speech being received and then a second user speech being sequentially received.

In describing the process of handling the second user speech with reference to FIG. 8, it is assumed that the process described with reference to FIG. 5 is previously performed.

The processor 140 may receive the second user speech. When (or based on) the second user speech is received, the processor 140 may identify at least one domain associated with the second user speech through the domain classifier. For example, the domain classifier may identify the second domain and the third domain as at least one domain associated with the second user speech.

As described above with reference to FIG. 7, the processor 140 may maintain data corresponding to at least one domain associated with the first user speech loaded in the volatile memory 130 in the volatile memory 130 for a predetermined period of time. A starting point and an ending point (or length) of the predetermined period of time may be determined in a variety of ways, and may also be changed by a manufacturer or a user of the electronic device 100 in accordance with various embodiments.

For example, the starting point of the predetermined period of time may be determined as the time when reception of the first user speech is completed or the time when the response of the electronic device 100 to the first user speech is output. In addition, if the second user speech is not received within a time when a predetermined time elapses from the starting time of the predetermined period, the time point at which the predetermined period has elapsed can be set to the end point of the predetermined period. If (or based on) the second user speech is received within a time of the predetermined period from the predetermined time point, the predetermined period may be again estimated from the time when the reception of the second user speech is completed or the time when the response of the electronic device 100 with respect to the second user speech is outputted.

As described above, the volatile memory 130 may be implemented as the DRAM. In the case of the DRAM, since the data is stored by charging electrons in a capacitor, the stored data is lost as the charged electrons are discharged after a certain period of time passes, according to a feature of the capacitor. Accordingly, refresh techniques are applied to periodically rewrite data in order to maintain the data stored in the DRAM. That is, the processor 140 can maintain the stored data by periodically refreshing the data stored in the volatile memory 130 for a predetermined period of time.

While the maintenance of data corresponding to at least one domain associated with the first user speech has been primarily described, it is understood that at least some of the data for (e.g., required for) processing of the second user speech of the data loaded into the volatile memory 130 for processing for the first user speech can be maintained in the volatile memory 130 according to various embodiments.

Hereinafter, a case in which data corresponding to at least one domain associated with a first user speech is maintained in a volatile memory is described. That is, as shown in FIG. 8, an example in which the first domain-related data and the second domain-related data among the data classified according to the plurality of domains are maintained in the volatile memory 130 is described.

If (or based on) at least one domain associated with the second user speech is identified as described above, the processor 140 may compare the at least one domain associated with the first user speech and the at least one domain associated with the second user speech through the flow controller. Specifically, the processor 140 may compare the at least one domain associated with the first user speech with at least one domain associated with the second user speech to identify whether at least one domain associated with the second user speech is included in at least one domain associated with the first user speech. If the domain corresponding to the first user speech and the domain corresponding to the second user speech are plural in number, the processor 140 can sequentially compare the domain by domain or compare the entire domain at the same time.

As a result of the comparison between the at least one domain associated with the first user speech and the at least one domain associated with the second user speech, the processor 140 may determine whether to load the data classified according to a plurality of domains through the flow controller.

If (or based on) it is determined that the data according to the plurality of domains is not loaded, the processor 140 may not load data corresponding to at least one domain associated with the second user speech of the data classified according to the plurality of domains. Specifically, if at least one domain associated with the second user speech is identified as being included in at least one domain associated with the first user speech, the processor 140 may not further load the data classified according to the plurality of domains into the volatile memory.

If (or based on) it is determined that loading data classified according to a plurality of domains is to be loaded, the processor 140 may load data corresponding to at least one domain associated with the second user speech of the classified data according to the plurality of domains. Specifically, if it is identified that a domain not included in at least one domain associated with the first user speech of the at least one domain associated with the second user speech is present, the processor 140 may load data, among the data classified according to a plurality of domains, corresponding to at least one domain associated with the second user speech and different from the data maintained in the volatile memory, into the volatile memory.

The processor 140 may identify a domain not included in at least one domain associated with the first user speech among at least one domain associated with the second user speech as a new domain, and selectively load only the data corresponding to the identified new domain, among the data classified according to a plurality of domains, into the volatile memory.

For example, as shown in FIG. 7, the processor 140 may identify a third domain as a new domain that is not included in at least one domain associated with the first user speech of the at least one domain associated with the second user speech. The processor 140 can selectively load only data corresponding to the third domain identified as the new domain among data classified according to the plurality of domains into the volatile memory 130. The loading of data classified according to a plurality of domains can be performed by the data loader and calling the data loader by the flow controller as described with reference to FIG. 5.

When (or based on) all of the data corresponding to at least one domain associated with the second user speech among the data classified according to the plurality of domains is loaded into the volatile memory 130 according to the above-described process, the NLU engine can acquire information on the intention of the user corresponding to the second user speech by performing natural language understanding on the basis of the data corresponding to the second domain among the data classified according to the plurality of domains and the data corresponding to the third domain. The data processing can be performed through the data handler before the natural language understanding is performed by the NLU engine, as illustrated in FIG. 4.

If the processor 140 loads data corresponding to at least one domain associated with the second user speech, the processor 140 may control the data not corresponding to the domain associated with the second user speech of the data already loaded in the volatile memory to be not loaded into the volatile memory. Here, that the data is not loaded into the memory means that the memory area in which the data was written is written to 0 (or null data) or the new data is written to the corresponding memory area.

While it has been described that, if the data classified according to a plurality of domains is loaded into the volatile memory 130, loaded data is processed and natural language understanding is performed using the processed data, it is understood that one or more other embodiments are not limited thereto. For example, according to another embodiment, the processor 140 can store the data loaded in the volatile memory 130 and processed by the data handler in the non-volatile memory 120, thereby reducing the time for (e.g., required for) processing the data later.

The process of processing the received second user speech after the first user speech has been received has been described above, but it is understood that one or more other embodiments are not limited thereto. For example, according to another embodiment, the process of processing the second user speech can be applied to the received third user speech in the same manner after the second user speech is received.

According to various embodiments as described above, if the first user speech and the second user speech are sequentially received, in the loading process of data classified according to a plurality of domains for performing natural language understanding of the second user speech, the data loading time and the processing speed for the second user speech can be improved by utilizing the data that is already loaded and maintained in the volatile memory 130.

Figure 9:
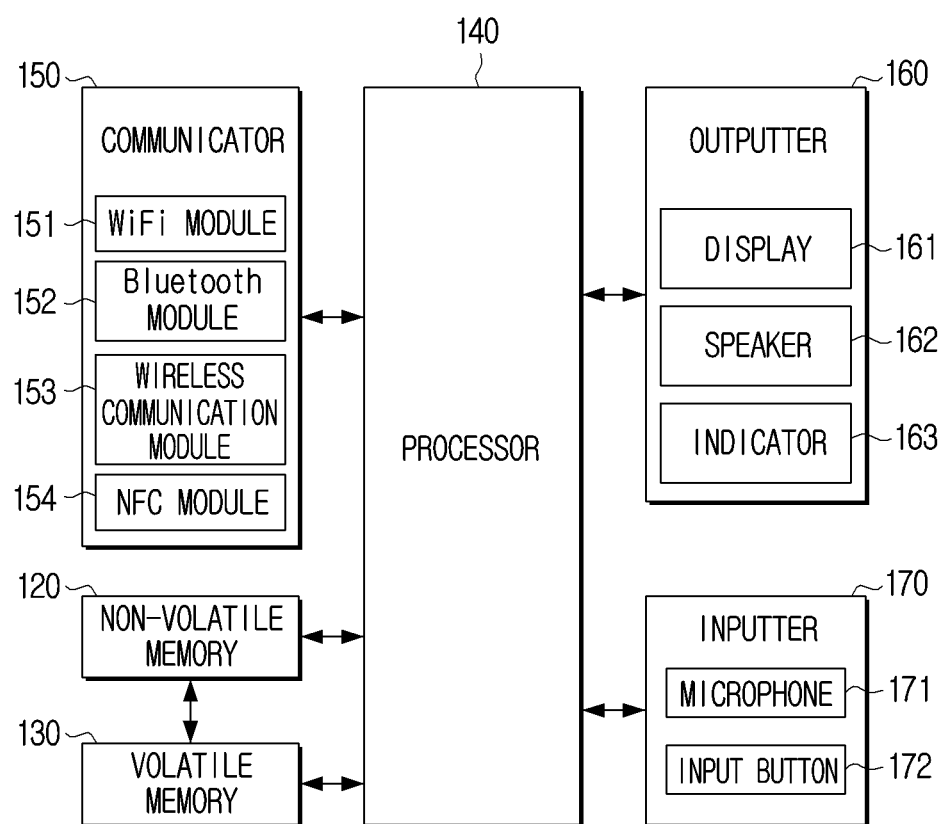
FIG. 9 is a block diagram illustrating a detailed configuration of an electronic device according to an embodiment.

FIG. 9 is a block diagram illustrating a detailed configuration of an electronic device 100 according to an embodiment.

As shown in FIG. 1, the electronic device 100 includes the microphone 110, the non-volatile memory 120, the volatile memory 130, and the processor 140, and may further include a communicator 150, an outputter 160, and an inputter 170. However, the illustrated configurations are merely exemplary and an additional component or configuration may be added or one or more components or configurations may be omitted according to various embodiments.

The communicator 150 includes a circuit and can communicate with a server or an external device. Specifically, the processor 140 may receive various data or information from a server or an external device connected through the communicator 150, and may transmit various data or information to a server or an external device. In addition, the communicator 150 may include at least one of a Wi-Fi module 151, a Bluetooth module 152, a wireless communication module 153, and a near field communication (NFC) module 154.

The processor 140 may receive data related to speech recognition and natural language understanding as described above from a server via the communicator 150, and update the data stored in the non-volatile memory 120.

The processor 140 may transmit a result of at least some of the voice recognition and natural language understanding process according to the disclosure through the communicator 150 to a server and receive results from a server for some other process. That is, one or more embodiments may be implemented in the form of an on-device in the electronic device 100, and at least a portion of the process according to the disclosure may be implemented via at least one server.

The trigger input according to an embodiment may be received from a remote control device for controlling the electronic device 100 via the communicator 150. Specifically, if a control signal for performing speech recognition is generated from a remote control device, the processor 140 may receive a control signal through the communicator 150.

The outputter 160 may include a circuit, and the processor 140 may output various functions that the electronic device 100 may perform through the outputter 160. The outputter 160 may include at least one of a display 161, a speaker 162, and an indicator 163.

The display 161 may output image data under the control of the processor 140. The display 161 according to an embodiment may display a user interface (UI) by the control of the processor 140. The display 161 may be implemented as a liquid crystal display (LCD) panel, an organic light emitting diode (OLED) display, or the like, and the display 161 may also be implemented as a flexible display, a transparent display, or the like. However, the display 161 is not limited to a specific type. The speaker 162 may output audio data under the control of the processor 140, and the indicator 163 may be turned on or off under the control of the processor 140.

Specifically, in various embodiments, the outputter 160 may output, under the control of the processor 140, a processing result according to the reception of the trigger input, a response corresponding to the received user speech, a guide message for the user of the electronic device 100, or the like. The display 161 may display a progress bar representing the progress of data loading or the handling progress of speech recognition and natural language understanding, under the control of the processor 140, and may also display information indicating whether data classified according to the plurality of domains is maintained in the volatile memory 130, or the like.

The inputter 170 includes a circuit and the processor 140 may receive user commands for controlling the operation of the electronic device 100 via the inputter 170. Specifically, the inputter 170 may include a microphone 171, an input button 172, a camera, and the like, and the inputter 170 may be implemented in the form of being included in a touch display.

The inputter 170 may receive a trigger input to perform speech recognition. While the trigger input has been described above as being received via the microphone 171 in the form of user speech including a preset trigger word, it is understood that one or more other embodiments are not limited thereto. For example, according to another embodiment, the trigger input may be received via an input button 172 on the electronic device 100 to receive a trigger input. The input button 172 may be a physical button physically disposed on an exterior of the electronic device 100, or a soft button implemented in the form of a user interface (UI) displayed on the touch display.

According to various embodiments as described above, virtual assistant model data, that is, data for performing speech recognition and natural language understanding, can be loaded in parallel, thereby efficiently processing the entire process of speech recognition and natural language understanding.

The data loading time may be shortened by selectively loading only the data corresponding to the domain identified as being related to the received user speech, without loading all the data classified according to a plurality of domains into the volatile memory 130.

In addition, since only the data corresponding to the domain identified as associated with the received user speech among the data classified according to the plurality of domains is selectively loaded into the volatile memory 130, the processing time of the loaded data can also be shortened, and the amount of data referenced in the process of performing natural language understanding may be reduced, thereby shortening the time of the natural language understanding process as well.

If the first user speech and the second user speech are sequentially received, in the loading process of data classified according to a plurality of domains for performing natural language understanding of the second user speech, the processing speed for the loading time and the second user speech of the data can be improved by utilizing the data that is already loaded and maintained in the volatile memory 130.

The WoV model is loaded into the volatile memory 130 in advance when the electronic device is turned-on, thereby further improving the speed of handling the electronic device 100 associated with a user speech.

In the related art, the loading of the relevant data and the process of initializing each module are performed sequentially in the order of, for example, the domain classifier, the rule engine, the criteria handler, the DNN engine and the other various modules, the data loader, and the data handler. Meanwhile, the selective loading process and the parallel loading process according to various embodiments as described above provides an AI assistant function with a significantly improved processing speed as compared to the related art.

As described above, the controlling method of the electronic device 100, the process of controlling of the processor, and various embodiments thereof can be implemented as a program and provided to the electronic device 100. In particular, a program that includes the controlling method of the electronic device 100 may be stored and provided in a non-transitory computer readable medium.

The non-transitory computer readable medium refers to a medium that stores data semi-permanently rather than storing data for a very short time, such as a register, a cache, a memory or etc., and is readable by an apparatus. In detail, the aforementioned various applications, instructions, or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

At least one of the plurality of modules may be implemented through an AI model. A function associated with AI may be performed through the non-volatile memory 120, the volatile memory 130, and the processor 140.

The processor 140 may include one or a plurality of processors 140. At this time, one or a plurality of processors 140 may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors 140 control the processing of the input data in accordance with a predefined operating rule or artificial intelligence (AI) model stored in the non-volatile memory 120 and the volatile memory 130. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

While the disclosure has been illustrated and described with reference to various example embodiments, it will be understood that the various example embodiments are intended to be illustrative, not limiting. One of ordinary skill in the art will understand that various changes in form and details may be made without departing from the spirit and scope of the disclosure, including the appended claims and their equivalents.

What is claimed is:

1. An electronic device comprising:
   a microphone;
   a non-volatile memory configured to store virtual assistant model data comprising data that is classified according to a plurality of domains and data that is commonly used for the plurality of domains;
   a volatile memory; and
   a processor configured to:
      based on receiving a first user speech through the microphone, identify at least one first domain regarding the first user speech,
      based on identifying the at least one first domain regarding the first user speech, load first data dependent on the identified at least one first domain from among the virtual assistant model data from the non-volatile memory into the volatile memory, and
      while loading the first data into the volatile memory, load second data that is not dependent on the identified at least one first domain from among virtual assistant model data from the non-volatile memory into the volatile memory.

2. The electronic device of claim 1, wherein the processor is further configured to, based on receiving, through the microphone, a trigger input to perform speech recognition for a user speech, initiate loading the virtual assistant model data from the non-volatile memory into the volatile memory.

3. The electronic device of claim 1, wherein the processor is further configured to:
   based on receiving the first user speech through the microphone, obtain a first text corresponding to the first user speech by performing speech recognition for the first user speech; and
   based on the obtained first text, identify the at least one first domain corresponding to the first user speech among the plurality of domains.

4. The electronic device of claim 3, wherein the processor is further configured to, based on the identified at least one first domain, load the first data comprising data corresponding to the identified at least one first domain, from among the data classified according to the plurality of domains, into the volatile memory.

5. The electronic device of claim 4, wherein the processor is further configured to:
   process the loaded first data corresponding to the identified at least first one domain; and
   perform natural language understanding for the first text based on the processed first data.

6. The electronic device of claim 4, wherein the processor is further configured to, maintain the loaded first data corresponding to the identified at least one first domain in the volatile memory for a predetermined period.

7. The electronic device of claim 6, wherein the processor is further configured to:
   based on receiving a second user speech through the microphone while the first data corresponding to the identified at least one first domain is maintained in the volatile memory, identify at least one second domain corresponding to the second user speech; and
   load third data, among the data classified according to the plurality of domains, corresponding to the identified at least one second domain and different from the first data, into the volatile memory.

8. The electronic device of claim 2, wherein the processor is further configured to:
- based on the electronic device being turned on, load data, among the data commonly used for the plurality of domains, corresponding to a module for recognizing the trigger input, into the volatile memory; and
- based on recognizing the trigger input using the loaded data corresponding to the module for recognizing the trigger input, determine to perform the speech recognition for the user speech.

9. A method for controlling an electronic device comprising a volatile memory and a non-volatile memory storing virtual assistant model data including data classified in accordance with a plurality of domains and data commonly used for the plurality of domains, the method comprising:
- based on receiving a first user speech through the microphone, identifying at least one first domain regarding the first user speech;
- based on identifying the at least one first domain regarding the first user speech, loading first data dependent on the identified at least one first domain from among the virtual assistant model data from the non-volatile memory into the volatile memory; and
- while loading the first data into the volatile memory, loading second data that is not dependent on the identified at least one first domain from among virtual assistant model data from the non-volatile memory into the volatile memory.

10. The method of claim 9, further comprising:
based on receiving, through the microphone, a trigger input to perform speech recognition for a user speech, initiating loading the virtual assistant model data from the non-volatile memory into the volatile memory.

11. The method of claim 9, further comprising:
- based on receiving the first user speech, obtaining a first text corresponding to the first user speech by performing speech recognition for the first user speech; and
- based on the obtained first text, identifying the at least one first domain corresponding to the first user speech among the plurality of domains.

12. The method of claim 11, wherein the loading the first data comprises:
based on the identified at least one first domain, loading the first data comprising data corresponding to the identified at least one first domain, from among the data classified according to the plurality of domains, into the volatile memory.

13. The method of claim 12, further comprising:
- processing the loaded first data corresponding to the identified at least one first domain; and
- performing natural language understanding for the first text based on the processed first data.

14. The method of claim 12, further comprising:
maintaining the loaded first data corresponding to the identified at least one first domain in the volatile memory for a predetermined period.

15. The method of claim 14, further comprising:
- based on receiving a second user speech while the first data corresponding to the identified at least one first domain is maintained in the volatile memory, identifying at least one second domain corresponding to the second user speech; and
- loading third data, among the data classified according to the plurality of domains, corresponding to the identified at least one second domain and different from the first data, into the volatile memory.

16. The method of claim 10, further comprising:
- based on the electronic device being turned on, loading data, among the data commonly used for the plurality of domains, corresponding to a module for recognizing the trigger input, into the volatile memory; and
- based on recognizing the trigger input using the loaded data corresponding to the module for recognizing the trigger input, determining to perform the speech recognition for the user speech.

17. A non-transitory computer readable recording medium having recorded thereon instructions executable by at least one processor for performing the method of claim 9.

* * * * *